US008319862B2

(12) United States Patent
Mangoubi et al.

(10) Patent No.: US 8,319,862 B2
(45) Date of Patent: Nov. 27, 2012

(54) NON-UNIFORMITY CORRECTION OF IMAGES GENERATED BY FOCAL PLANE ARRAYS OF PHOTODETECTORS

(75) Inventors: Shmuel Mangoubi, Haifa (IL); Oved Naveh, Haifa (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 868 days.

(21) Appl. No.: 12/162,366

(22) PCT Filed: Jan. 25, 2007

(86) PCT No.: PCT/IL2007/000101
§ 371 (c)(1),
(2), (4) Date: Oct. 6, 2008

(87) PCT Pub. No.: WO2007/086063
PCT Pub. Date: Aug. 2, 2007

(65) Prior Publication Data
US 2009/0079854 A1    Mar. 26, 2009

(30) Foreign Application Priority Data
Jan. 29, 2006  (IL) .......................................... 173418

(51) Int. Cl.
*H04N 9/64* (2006.01)
(52) U.S. Cl. ........................ 348/251; 348/345
(58) Field of Classification Search .................. 348/251, 348/229.1, 345, 362
See application file for complete search history.

(56) References Cited

U.S. PATENT DOCUMENTS

| | | | |
|---|---|---|---|
| 4,298,887 A | 11/1981 | Rode | |
| 4,795,904 A | 1/1989 | Richards | |
| 5,113,263 A | 5/1992 | Audaire et al. | |
| 5,264,940 A | 11/1993 | Komiya et al. | |
| 5,363,208 A | 11/1994 | Ogino et al. | |
| 5,502,482 A * | 3/1996 | Graham | .......................... 348/140 |
| 5,600,369 A | 2/1997 | Cazaux et al. | |
| 5,925,880 A | 7/1999 | Young et al. | |
| 5,925,883 A | 7/1999 | Woolaway, II | |
| 6,130,713 A | 10/2000 | Merrill | |

(Continued)

FOREIGN PATENT DOCUMENTS

EP            0567864            1/1993
(Continued)

*Primary Examiner* — Scott J Sugarman
*Assistant Examiner* — Vipin Patel
(74) *Attorney, Agent, or Firm* — Mark M friedman

(57) ABSTRACT

Methods and apparatus for effecting a non-uniformity correction of images of a scene obtained with an array of detector elements are disclosed. A first image of the scene having a first integration period is acquired using the array of detector elements. A second image of the scene having a different integration period is acquired, and a corrected image of the scene is generated by computing a difference of the images. In some embodiments, the first and second images are images of substantially identical scenes. According to some embodiments, the images are infrared images. Optionally, the corrected image is subjected to further correction using pixel dependent correction coefficients, such as gain coefficients. Exemplary image detection elements include but are not limited to InSb detector elements and ternary detector elements, such as InAlSb, MCT (Mercury Cadmium Telluride), and QWIP technology (Quantum Well Infrared Photodiodes). In some embodiments, the detector elements are cooled to a temperature substantially equal to an atmospheric boiling point of liquid nitrogen. Alternatively, the detector elements are cooled to a temperature below an atmospheric boiling point of liquid nitrogen, or any other operating temperature.

31 Claims, 12 Drawing Sheets

U.S. PATENT DOCUMENTS

| | | | |
|---|---|---|---|
| 6,806,469 B2 * | 10/2004 | Kerr | 250/330 |
| 6,965,416 B2 * | 11/2005 | Tsuchiya et al. | 348/606 |
| 7,075,569 B2 * | 7/2006 | Niikawa | 348/218.1 |
| 2002/0159101 A1 | 10/2002 | Alderson | |
| 2003/0021474 A1 * | 1/2003 | Hunter et al. | 382/167 |
| 2003/0198400 A1 | 10/2003 | Alderson et al. | |
| 2004/0247175 A1 * | 12/2004 | Takano et al. | 382/154 |
| 2006/0114272 A1 * | 6/2006 | Taniguchi et al. | 345/690 |

FOREIGN PATENT DOCUMENTS

| | | |
|---|---|---|
| JP | 2000121570 | 4/2000 |
| JP | 2000352663 | 12/2000 |
| WO | WO9900649 | 1/1999 |
| WO | WO2004079430 | 9/2004 |

* cited by examiner

NON-UNIFORMITY CORRECTION OF IMAGES GENERATED BY FOCAL PLANE ARRAYS OF PHOTODETECTORS

FIELD OF THE INVENTION

The present invention relates generally to photodetectors (e.g. infrared detectors), and more particularly to methods and systems for compensating for non-uniformities among detector elements of a staring detector array.

BACKGROUND OF THE INVENTION

Imagery collected using certain arrays of infrared detectors (or sensors) suffers from non-uniformity noise due to a number of factors, including variations between detector elements in dark current (leakage current), offset (bias) and responsivity (gain). Other sources of non-uniformity noise include electronic readout non-uniformities and non-uniformities of low spatial frequency including non-uniformities derived from device optics (e.g. due to the decrease in radiation from the center to the edge of the field of view,) and non-uniformities stemming from uneven cooling of detector elements. In many situations, the non-uniformity noise adversely affects image quality.

A number of methods have been tried for effecting a non-uniformity correction. Some methods use a uniform calibration source or reference image to compute pixel-dependent offset coefficients for each pixel. Alternatively, the image is defocused on the array of detector elements, and this is used as a reference image. Nevertheless, it is recognized that the calibration is good only at background temperatures near the reference temperature. In order to effect a non-uniformity correction valid over a wider temperature range, two point correction (TPC) techniques employing reference images taken against a uniform background at two different temperatures are commonly used.

According to the TPC techniques, reference coefficients derived from the reference images are stored in gain and offset tables, and the non-uniform correction is subsequently carried out in real-time. The reference images may be the average over a number of frames to suppress temporal noise. Although the gain coefficients are generally stable, the offset coefficients drift and can require frequent calibration. Towards this end, a reference or defocus block may be inserted every few minutes, or even in alternate frames using a chopper.

There is an ongoing need for improved techniques to compensate for non-uniformity noise in multi-element infrared detector arrays. Preferably, the technique would not employ image blurring, would not require use of complex mechanical systems, and would not require frequent recalibration.

Below is a list of US Patents and US published patent applications providing potentially relevant background art. Each of these US Patents and US published patent applications are incorporated herein by reference: U.S. Pat. Nos. 4,298,887; 4,795,904; 5,925,880; US 2002/0159101; US 2003/0198400.

SUMMARY OF THE INVENTION

The aforementioned needs are satisfied by several aspects of the present invention.

It is now disclosed for the first time a method of imaging a scene with an array (e.g. a focal plane array) of photodetector elements. The presently disclosed method includes using the photodetector elements to obtain a first image of the scene having a first integration period, using the detector elements to obtain a second image of the scene having a second integration period different from first integration period and generating a corrected image of the scene by computing a difference between the first and second images.

Not wishing to be bound by any particular theory, it is noted that while some factors responsible for introducing non-uniformity among detector elements depend on the integration period of the image captured by the constitutive photodetector elements, other factors are essentially independent of this integration period. Therefore, by generating a pair of images having different integration periods and by computing a difference between the two images, a corrected image is obtained where the latter set of factors responsible for non-uniformity are essentially cancelled out. It is noted that for each of the two images, the non-uniformity due to factors essentially independent of the integration period is substantially identical, and therefore computing a difference of these images, on a pixel by pixel basis, virtually eliminates non-uniformity due to these exposure time independent factors, and produces a corrected image with a reduced overall non-uniformity.

Because the first and second images have different integration periods, scene details in the resulting corrected image derived from the difference of the images are not eliminated, despite the fact that the first and second images are images of a substantially identical scene.

It is noted that focal plane arrays of photodetectors for detecting electromagnetic radiation of any wavelength are within the scope of the present invention. In exemplary embodiments, the first and second images are infrared images, and a corrected infrared image is generated. According to some embodiments, the array of photodetectors (e.g. the focal plane array) includes infrared detectors (for example, photodetector elements operative to detected electromagnetic radiation having a wavelength between 3 microns and 5 microns, or photodetector elements operative to detected electromagnetic radiation having a wavelength between 8 microns and 12 microns).

According to some embodiments, the corrected image is frame of a video sequence, and thus the steps of obtaining the first and second images and obtaining the corrected image are repeated for a plurality of times to form the video sequence. Optionally, the presently disclosed method further includes, for each image pixel of the corrected image, effecting a further correction by computing a function of a pixel value of the corrected image and a pixel-specific correction coefficient.

According to some embodiments, the pixel-specific correction coefficient is a gain correction coefficient, and the function is a multiplication.

Not wishing to be bound by any particular theory, it is noted that the present inventor has found that the gain coefficients used to correct the corrected image tend to be stable over time, thereby obviating the need to frequently re-calibrate the gain coefficients.

Typically, the calibration with a reference image to compute gain coefficients is a one-time calibration, though it is appreciated that periodically (e.g. every few weeks, months or years) a new reference image may be acquired and used to re-calibrate in order to help reduce residual non-uniformity.

According to some embodiments, pixel-specific coefficients are predetermined pixel-specific coefficients, and the predetermining of the pixel-specific correction coefficient includes the step of obtaining at least one reference image using the photodetector elements.

According to some embodiments, the reference image is taken against a substantially uniform background.

According to some embodiments, at least a pair of reference images is obtained, each image of the pair of reference images having a different integration period.

According to some embodiments, each image of the pair of reference images is obtained at against uniform backgrounds of substantially the same temperature.

According to some embodiments, a plurality of reference images is obtained, including a first reference image taken against a substantially uniform background of a first temperature, and a second reference image taken against a substantially uniform background of a second temperature different from the first temperature.

According to some embodiments, the presently disclosed method further includes correcting for image non-uniformity derived from factors dependent on the image integration period.

According to some embodiments, factors dependent on the image integration period include but are not limited to non-uniform gain, dark current and non-uniformities due to device optics.

According to some embodiments, the presently disclosed method further includes correcting for image non-uniformity due to a factor other than non-uniformity of the detector elements.

According to some embodiments, the presently disclosed method further includes correcting for a gradual non-uniformity having a low spatial frequency.

According to some embodiments, the method is implemented using detector elements cooled to a temperature below an atmospheric boiling temperature of liquid nitrogen, or to any other operating temperature.

According to some embodiments, the method is implemented using detector elements cooled to a temperature that is substantially an atmospheric boiling point of liquid nitrogen.

According to some embodiments, the method is implemented using a staring imaging system including a two dimensional array of photodetector elements at any operating temperature.

It is now disclosed for the first time a multi-element electro-optical imaging system (e.g. a staring imaging system). The presently disclosed staring imaging system includes a focal plane array of photodetector elements for generating images of a scene, an image integration period regulator for regulating integration periods of the images to capture with the detector elements a first image of the scene having a first integration period and a second image of the scene having a second integration period, and electronic circuitry for generating a corrected image of the scene by computing a difference between the first and second images.

According to some embodiments, the first and second images are infrared images, and the electronic circuitry is operative to generate a corrected infrared image.

According to some embodiments, the presently disclosed system further includes a cooling unit for cooling the detector elements to a temperature that is less than an atmospheric boiling point of liquid nitrogen (or to any other operating temperature).

According to some embodiments, the presently disclosed system further includes a cooling unit for cooling the detector elements to a temperature that is substantially equal to an atmospheric boiling point of liquid nitrogen.

According to some embodiments, electronic circuitry is operative to effect an additional image correction by computing for each image pixel of the corrected image a function of the pixel value and a pixel-specific correction coefficient.

According to some embodiments, the pixel-specific correction coefficient is a gain correction coefficient, and the function is a multiplication function.

According to some embodiments, the electronic circuitry is operative to generate the correction coefficients from at least one previously generated reference image.

According to some embodiments, the electronic circuitry is operative to generate the correction coefficients from a plurality of previously generated reference images having different integration periods.

It is now disclosed for the first time a method of imaging a scene with an array of photodetector elements. The presently disclosed method includes using the detector elements to obtain a first image of the scene having a first integration period, using the detector elements to obtain a second image of the scene having a second integration period different from first integration period and generating a corrected image of the scene by computing a function of the first and second images.

According to some embodiments, the first and second images are images of substantially identical scenes These and further embodiments will be apparent from the detailed description and examples that follow.

DETAILED DESCRIPTION OF THE INVENTION

Figure 1:
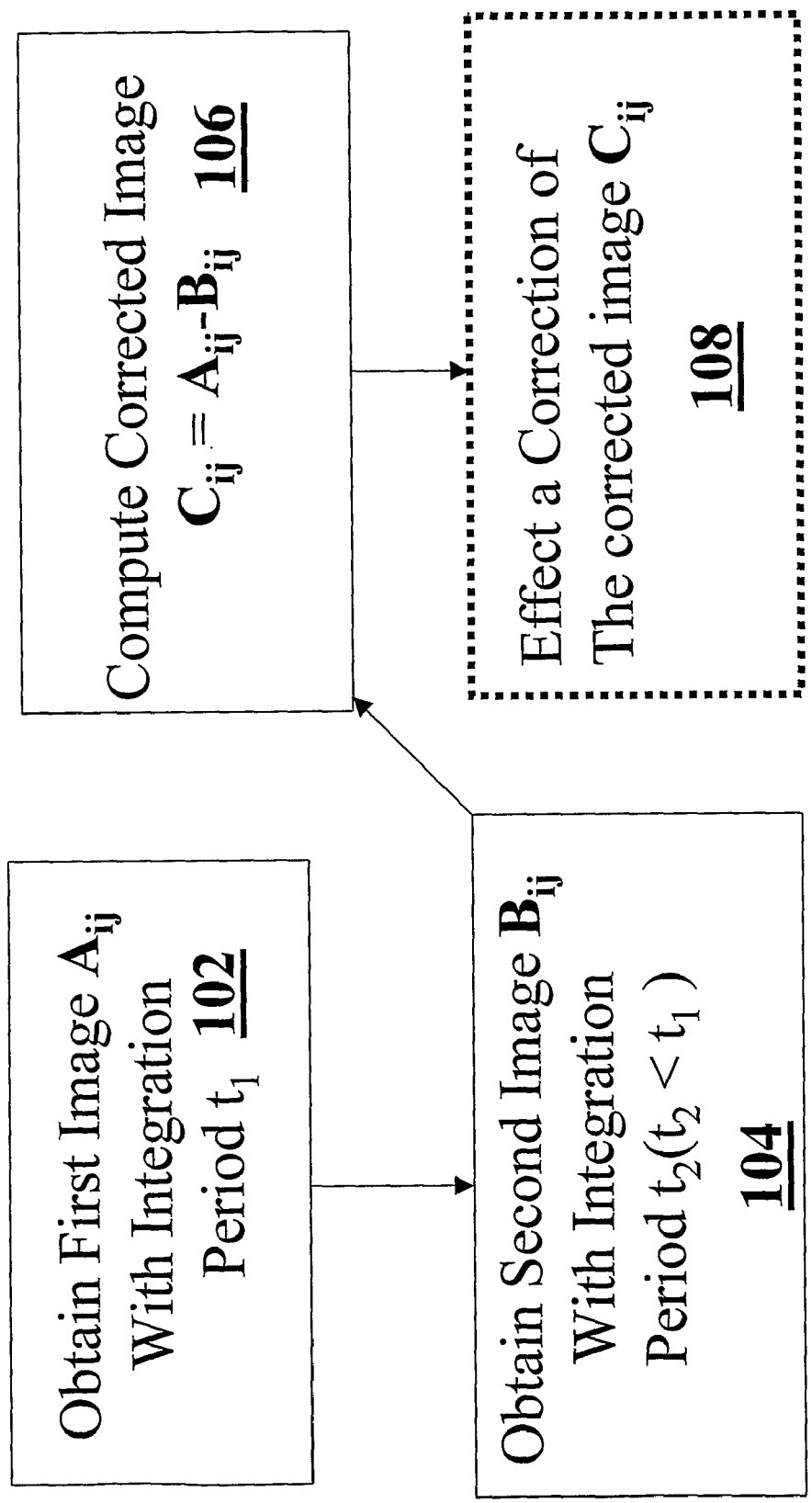
FIG. 1 provides a flowchart describing exemplary methods of correcting for non-uniformity noise according to some embodiments of the present invention.

FIG. 1 provides a block diagram describing an exemplary method for effecting a non-uniformity correction according to some embodiments of the present invention. As illustrated in FIG. 1, a first image $A_{ij}$ with an integration period $t_1$ is obtained 102, and subsequently a second image $B_{ij}$ with an integration period $t_2$ is obtained 104.

According to some embodiments, the first and second images are images of substantially identical scenes, e.g. the second image is acquired substantially immediately after the acquisition of the first image of the scene, and the imaging system or device is operative to substantially not change scene parameters between the first and second images, by, for example, interposing of an object between the scene and the detector elements and changing the image focus.

According to some embodiments, each of the first and second images are images of non-uniform scenes in contrast to, for example, reference images of black bodies.

From the first and second images a corrected image is $C_{ij}$ whose value is equal to the difference between the first and second image, is computed 106. Although as illustrated in FIG. 1 the image with the longer integration period is obtained before the image with the shorter integration period, it is appreciated that the order may be reversed.

Furthermore, it is noted that the present invention imposes no limitation on the value of either the first or second integration period. There is no specific limitation on the difference between the first and second integration periods, or on the ratio between the first and second integration periods. The skilled practitioner can choose appropriate values depending on a number of factors such as, for example, scene temperature, properties of the sensors, etc.

Nevertheless, it is recognized that in various examples the values of the first and second integration periods are in many examples not chosen to be nearly equal. Thus, in some examples, the difference between the longer and shorter integration periods is at least 0.1 ms, at least 0.2 ms, or at least 0.5 ms, though this is not a limitation of the present invention.

Furthermore, it is noticed that the methods and devices of the present invention do not require obtaining out of focus images, and thus, in some embodiments, the first and second images are substantially in-focus images.

Referring once more to FIG. 1, it is noted that optionally, the corrected image $C_{ij}$ is further corrected 108 according to any number of methods disclosed herein. In some embodiments, the corrected coefficients are subjected to a further correction for gradual non-uniformity having a low spatial frequency.

As used herein, a "gradual non-uniformity" refers to non-uniformities with a low spatial frequency, for example, where the magnitude of the component of the non-uniformity of the noise varies smoothly over a significant proportion of characteristic dimension of the image. In some embodiments, this proportion is 0.1. In some embodiments, this proportion is 0.25. Examples of gradual non-uniformity are typically caused by such factors as factors related to device optics (e.g. due to the decrease in radiation from the center to the edge of the field of view), and non-uniformities stemming from uneven cooling of detector elements.

It is noted that as described in FIG. 1, during step 108, a corrected image having a reduced level of non-uniformity noise due to factors substantially independent of image integration period is first obtained. Subsequently, non-uniformity noise due to factors dependent on image integration time is at least partially eliminated. Nevertheless, it is noted that this order is not a specific limitation of the present invention.

Figure 2:
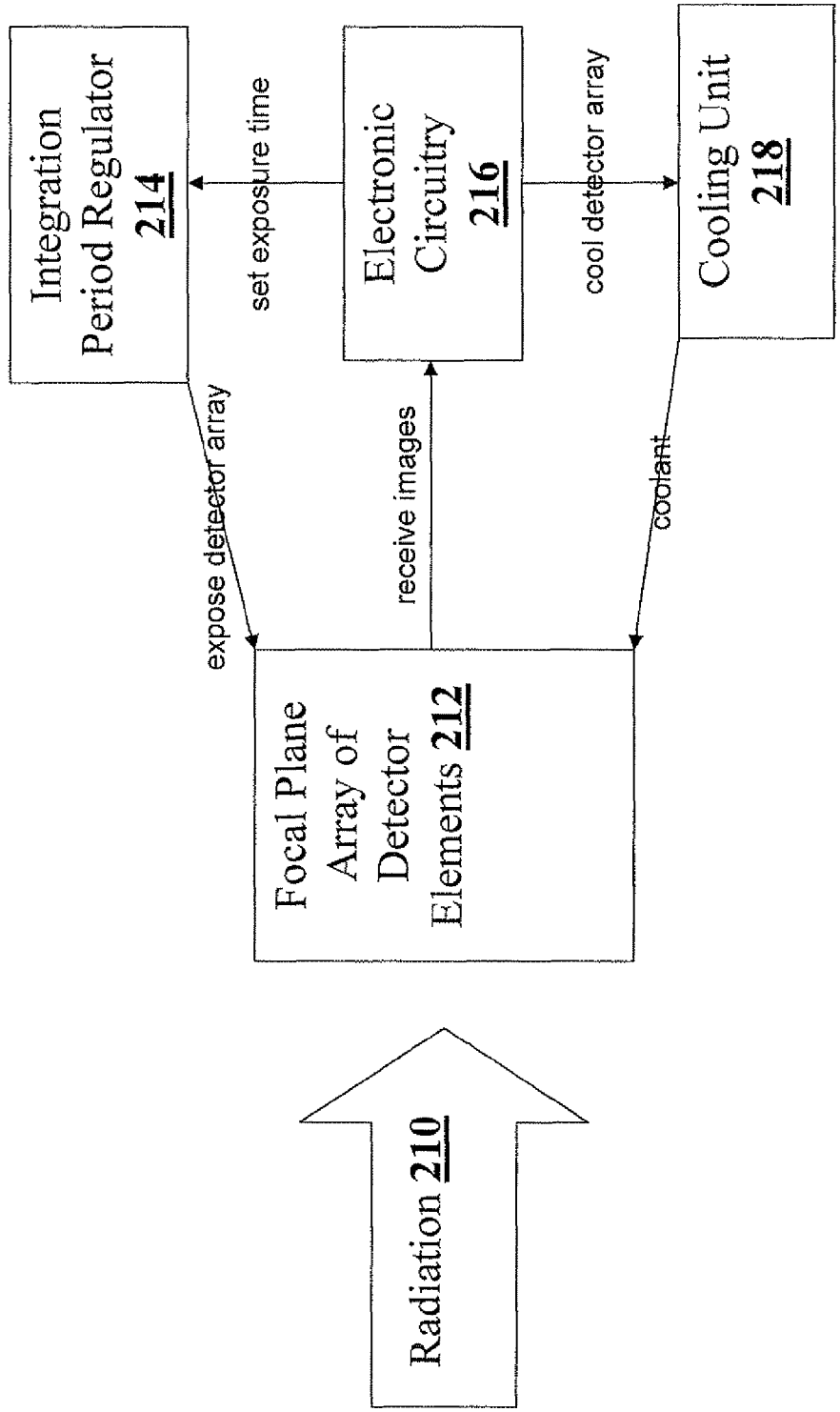
FIG. 2 provides a block diagram of a device for generating an infrared image of a scene according to exemplary embodiments of the present invention.

FIG. 2 provides a block diagram of a device for generating an image of a scene according to some embodiments of the present invention. An array of detector elements 212, cooled by a cooling unit 218, detects incoming electromagnetic radiation 210 from a scene to generate an image of the scene. The device includes an integration period regulator 214 including, for example, an electronic and/or a mechanical device for regulating an effective image exposure time. The integration period regulator 214 can include a mechanical device such as a shutter, exclusively electronic devices with no mechanical components, or can any combination of mechanical and electronic components known in the art.

The electronic circuitry 216 is operative to control the device so that a plurality of images having different integration periods is generated. Furthermore, the electronic circuitry includes an arithmetic logic unit for image processing. A first image of the scene having a first integration period is acquired, a second image of the scene having a second integration period is acquired, and then a difference between the images is computed to obtain a corrected image. Optionally, the electronic circuitry effects a correction of the corrected image, using, for example, correction coefficients such as gain correction coefficients.

Not wishing to be bound by any particular theory, it is noted that the present inventor has found that the gain coefficients used to correct the corrected image, such as those described in the Examples section, tend to be stable over time, thereby obviating the need to frequently re-calibrate the gain coefficients.

Thus, in some embodiments, the electronic circuitry 216 includes memory, including but not limited to volatile memory and/or non-volatile memory. Furthermore, it will be appreciated that as used herein, "electronic circuitry" refers to any combination of electronic hardware, software, programmable gate logic, firmware and the like.

In some embodiments, the device is operative to generate an image of the scene using any method described herein.

It is noted that in some embodiments, to reduce image non-uniformities due to dark current, the detector elements are cooled by the cooling unit 218 to a temperature below an atmospheric boiling point of liquid nitrogen, for example to about 70 K, though this is not a specific requirement of the present invention.

This may be accomplished using a number of techniques, and the present invention imposes no specific limitation on the type of cooling device. Exemplary cooling devices include but are not limited to J-T (Joule-Thomson) cooling devices and Stirling coolers. Furthermore, it is noted that the cooling unit for cooling the detector elements can use nitrogen, argon, or a mixture of these or any other appropriate liquefied gases known in the art.

Alternatively or additionally, a Thermo Electric Cooler suitable for specific types of sensors (e.g. certain ternary sensors) is provided.

It is noted that the skilled artisan may select which types of photodetector to include within the array of detector elements (e.g. focal plane array) 212, and there is no limitation on the type of detector elements. These detector elements may be operative for detecting any wavelength of electromagnetic radiation. Exemplary photodetector elements include but are not limited to CCD detector elements and InSb detector elements. Alternatively or additionally, other detector elements, for example, ternary detector elements (e.g. InAlSb or MCT—Mercury Cadmium Telluride), can be selected so as to reduce non-uniformities due to dark current.

The present inventors are disclosing that corrected images may be generated by computing a difference between two images having different integration periods. Furthermore, the present inventors have found that it is useful, in many situations, to apply one or more additional optional image correction techniques. More specifically, it will be explained how to apply various 2P correct techniques in the context of the present invention. It is notice that the 2P techniques described below are not the only correction technique that may be applied within the context of the present invention, and that there may be other techniques for calibrating gain coefficients in the context of the present invention.

Additional Image Correction Technique 1: Effecting a 2P Correction Using Reference Images Obtained at Different Temperatures For the two-point temperature correction (2-P Correction) described in this section, the integration period of every reference image has a substantially identical integration period. Two reference images, $T_H^{ij}$ and $T_L^{ij}$, obtained at a relatively high and relatively low temperatures respectively, are provided, wherein the superscripts i and j are used to identify a specific pixel. These reference images used in order to calcu late the pixel-specific gain and offset coefficient matrices as follows:

$$G_{ij} = \frac{(C_H - C_L)}{(T_H^{ij} - T_L^{ij})} \quad (1)$$

$$O^{ij} = -G^{ij} \cdot T_L^{ij} + C^{ij}$$

where the scalars $C_H$ and $C_L$ are the respective average values of the reference images $T_H^{ij}$ and $T_L^{ij}$. It is noted that in all multiplication and division operations are carried out on a pixel by pixel basis.

The pixel-specific gain and offset coefficient matrices are useful for computing a corrected image $T_{corrected}^{ij}$ from a detected image $T^{ij}$ as in the following formula:

$$T_{corrected}^{ij} = G^{ij} \cdot T^{ij} + O^{ij} = \frac{(C_H - C_L) \cdot (T^{ij} - T_L^{ij})}{(T_H^{ij} - T_L^{ij})} + C_L \quad (2)$$

Inspection of (2) indicates that (2) is most accurate when $T^{ij} = T_L^{ij}$ or $T^{ij} = T_L^{ij}$. Under these conditions, formula (2) respectively yields corrected images $C_L$ or $C_H$, identical to the respective uniform background images.

It is noted that the reference image is essentially free of temporal noise, and that the temporal noise in the corrected image is equal to that of the detected image.

Similarly, the signals from the scene will not be eliminated as they are absent from the reference image.

The present inventors are disclosing that it is useful to apply 2P correction techniques to correct a detected image INT1 having integration period $t_1$ with the following formula:

$$INT1_{CORRECTED}^{ij} = \quad (3)$$

$$G^{ij} \cdot (INT1^{ij} - INT2^{ij}) = (C_H - C_L)\frac{(INT1^{ij} - INT2^{ij})}{(T_H^{ij} - T_L^{ij})}$$

where the gain coefficients $G^{ij}$ are as defined in (1), the offset coefficients $O^{ij}$ are not used, and INT1 and INT2 are both detected images generated after obtaining the reference images, each of the images has different respective integration periods $t_1$ and $t_2$ ($t_1 > t_2$). Inspection of (3) reveals that a gain correction is applied to INT1−INT2, but that formula (3) lacks offset coefficients. Although lacking an explicit offset correction, taking the difference between images having different integration periods implicitly provides the appropriate correction. Indeed, comparison of (2) and (3) reveals that image INT1 takes the place of the detected image T to be corrected, where INT2 replaces the reference image $T_L$ in the numerator.

Additional Image Correction Technique 2: Effecting a 2P Correction Using Reference Images Having Different Integration Periods A second technique for applying 2P correction techniques in the context of the present invention will now be explained. Towards this end, pixel-specific correction coefficients (e.g. gain coefficients) derived using two integration periods are presented. According to this technique for applying 2P correction techniques in the context of the present invention, two reference images $INT1_R$ and $INT2_R$ having respective integration periods $t_1$ and $t_2$ ($t_2 < t_1$) are taken against a uniform background at a single temperature. Optionally, the reference image may be the average over N frames to suppress temporal noise.

These reference images are used to compute pixel-specific gain and offset coefficients as follows $$G^{ij} = \frac{(C_1 - C_2)}{(INT1_R^{ij} - INT2_R^{ij})} \quad (4)$$

$$O^{ij} = -G^{ij} \cdot INT2_R^{ij} + C_2$$

where $C_1$ and $C_2$ are the averaged image value, averaged over all pixels of the image, for reference images $INT1_R$ and $INT2_R$. It is noted that the pixel-specific gain and offset coefficients defined in (4) or (1) can be entered into a correction table and used to correct a subsequently obtained uncorrected image $INT1^{ij}$ having an integration period $t_1$ according to the formula:

$$INT1_{CORRECTED}^{ij} = \quad (5)$$

$$G^{ij} \cdot INT1^{ij} + O^{ij} = (C_1 - C_2)\frac{(INT1^{ij} - INT2_R^{ij})}{(INT1_R^{ij} - INT2_R^{ij})} + C_2$$

where the addition, subtraction, multiplication and division operations are carried out on a pixel-by-pixel basis. Inspection of (5) indicates that (5) is most accurate when the uncorrected measured image INT1 is identical to the reference image $INT1_R$ (or the reference image $INT2_R$) obtained from a uniform background. Under these conditions, formula (5) yields a corrected image C2 (or a corrected image C1), identical to the uniform background image for integration period $t_2$ (or $t_1$).

For the general case, the subsequently obtained INT1 image in general differs from the reference image $INT2_R$ due to a number of factors including:

a) signals from the scene that were not originally in the reference image;
b) deviations between the mean scene temperature and the temperature at which the reference images were obtained (e.g. due to the fact that the image is not obtained at reference temperature);
c) non-uniformities dependent on integration period, especially non-uniformities due to optical factors (e.g. $\cos^4\Phi$ non-uniformities), non-uniformities derived from non-uniform cooling and non-uniformities derived from non-uniformities in the dark current between detector elements;
d) non-uniformities dependent on changes in the sensor temperature.

It is noted that the reference image is essentially free of temporal noise, and that the temporal noise in the corrected image is equal to that of the detected image INT1. Similarly, the signals from the scene will not be eliminated as they are absent from the reference image.

It is noted that it is thus possible to effect a 2P correction with the formula:

$$INT1_{CORRECTED}^{ij} = \quad (6)$$

$$G^{ij} \cdot (INT1^{ij} - INT2^{ij}) = (C_1 - C_2)\frac{(INT1^{ij} - INT2^{ij})}{(INT1_R^{ij} - INT2_R^{ij})}$$

where the gain coefficients $G^{ij}$ are as defined in (4), the offset coefficients $O^{ij}$ are not used, and where INT1 and INT2 are both images generated after obtaining the reference images, each image having a different respective integration period. Because INT1 and INT2 are obtained within a short period of time of each other, the calculation of the difference of INT1−INT2 virtually eliminates elements (b), and part of the contributions in (c) listed above.

All arithmetic operations (e.g. addition, multiplication, subtraction, and division) are carried out on a pixel-by-pixel basis. As may be the case with any calibration procedure, it is noted that the integration periods $t_1$ and $t_2$ of the images may be different from the integration times used in the calibration procedure of the gain coefficients.

It still may be necessary to further correct for other factors responsible for non-uniformity in the corrected image especially those substantially dependent on infrared image integration period. As may be the case with any calibration procedure, it is noted that it may be advantageous to keep a few gain tables calibrated under different conditions, e.g. different combinations of mean scene temperature and sensor ambient temperature.

It is noted that the present inventors have found that the corrected image obtained with (6) can often yield a better corrected image than the image obtainable by the formula INT1−INT2.

EXAMPLES

The following examples are to be considered merely as illustrative and non-limiting in nature. It will be apparent to one skilled in the art to which the present invention pertains that many modifications, permutations, and variations may be made without departing from the scope of the invention.
Experimental Methods and Results The present inventors have performed experiments in order to demonstrate image correction techniques in accordance with some embodiments of the present invention.

Experiments were conducted in order to examine the effectiveness of using a plurality of detected images having different integration periods to implement a non-uniformity correction. An infrared camera (Rafael and Elop, with InSb detector) was used, where the internal NUC of the infrared camera was disabled. Every series of image was recorded twice, first with a longer integration period ($t_1$=about 1.5 ms) and then with a shorter integration period ($t_2$=about 0.5 ms).

The digital images were recorded using a Frame Grabber card, which enables recording of every third frame of the video images. The video images were recorded within a 2.5 second interval. First a series of INT1 images (with integration period $t_1$) were recorded and then a series of INT2 images (with integration period $t_2$) were recorded, were no more than one second elapsed between the recordings of the two series of images.

Some experiments were conducted at detector temperature of 70K while other experiments were conducted at 77K.

In order to generate the reference images, the detectors were situated against a uniform background which covered the lenses (actually, an extended area black-body). For every respective temperature a number of images were acquired.
Data Processing
The Data Processing Included the Following Steps:
  A) in every infrared camera a number of bad pixels were disqualified (a few tens of pixels which exhibited significant deviations in all of the images);
  B) for every series of pictures the average was calculated, in order to suppress temporal noise.
  C) the disqualified pixels were replaced with the median value of all the pixels.
  D) for each blackbody temperature the difference image INT1−INT2 was recorded.
  E) in order to reduce gradual non-uniformities due to optical factors (e.g. $cos^4\Phi$ non-uniformities) a HP filter was used.
  F) remaining non-uniformities were calculated as a standard deviation between pixels.

Figure 3A:
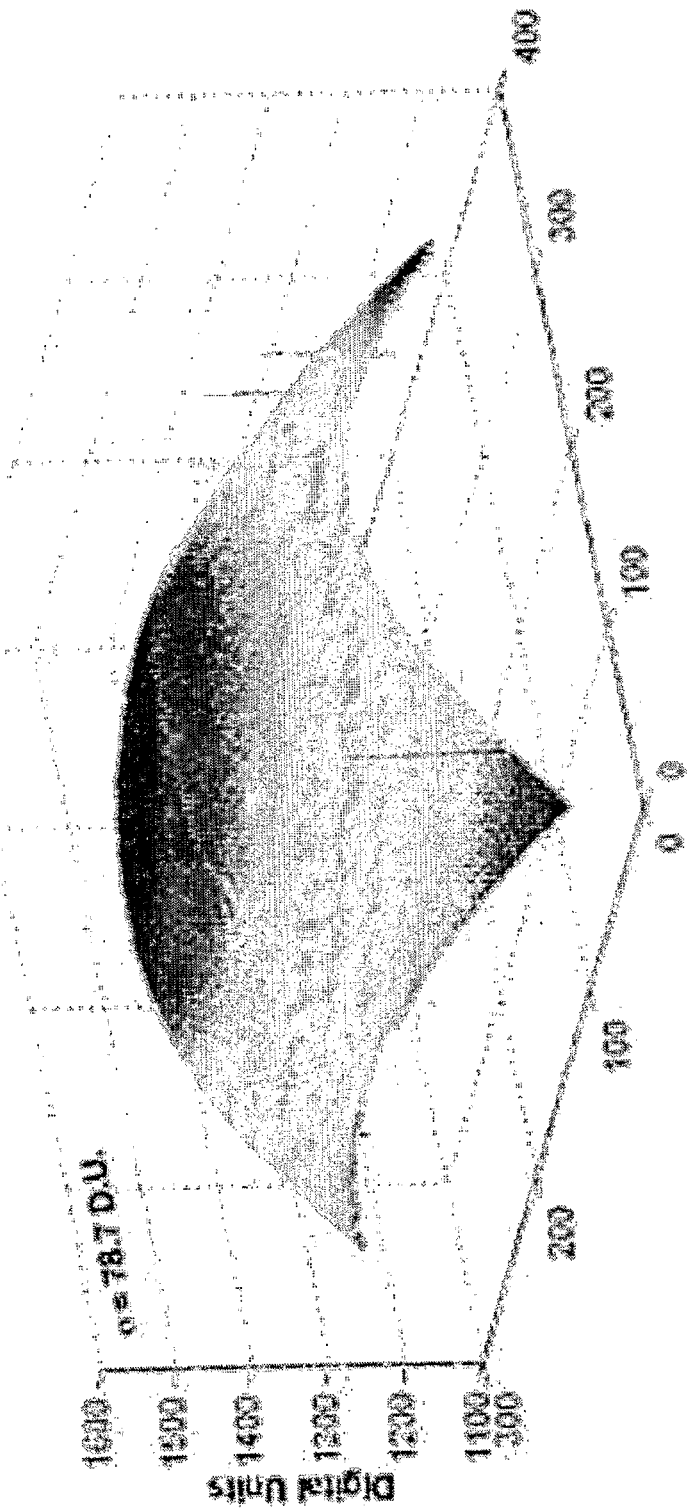
FIG. 3A-3B provides a 3-D representation of the image INT1–INT2 before and after HP (high-pass) filtering.
Figure 3B:
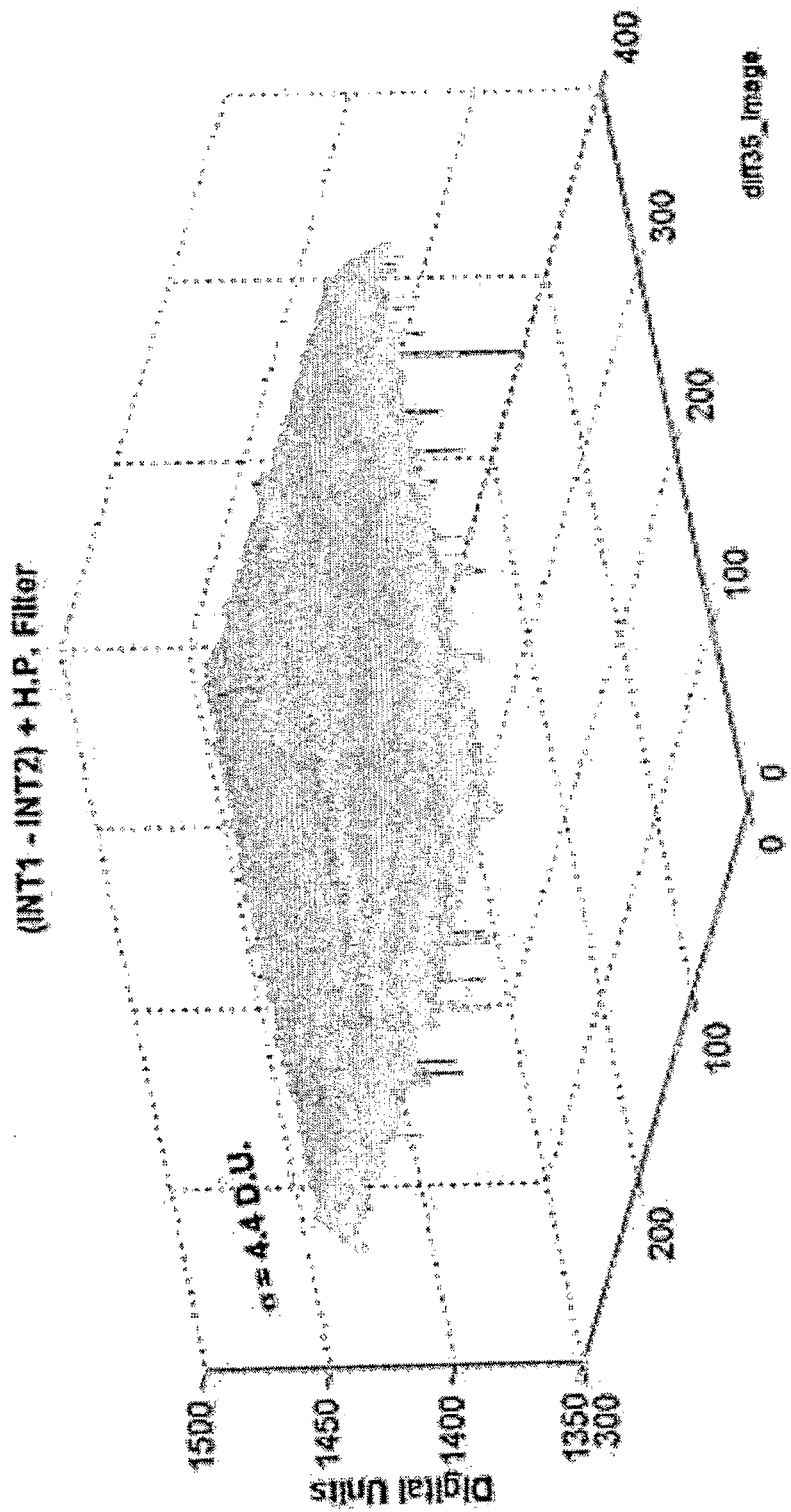

The black body images obtained after steps (D)-(E) are provided in FIGS. 3A-3B. FIGS. 3A-3B provide a 3-D image of INT1−INT2 at 35° C., where the latter image is the same image as the former after HP filtering. It is noted that the former image suffers from a non-uniformity gradient due to optical factors (e.g. $cos^4\Phi$ non-uniformities) and possibly non-uniform cooling of the detector elements. Thus, the standard deviation of this former image is 78.7 DU. After BP filtering (FIG. 3B), this is reduced to 4.4 LSB rms, which is still greater than the temporal noise of 1.5 LSB rms.

It is noted that the HP filtering was introduced in the context of the experiments in order to examine experimental results. In many situations, the BP filtering is not required, as any noise eliminated by the HP filtering does not, in general, bother a human viewer of the image. In the context of the experiments, the HP filter is introduced in order to assess the pixel-to-pixel (or high spatial frequency) N.U. component.

Figure 4A:
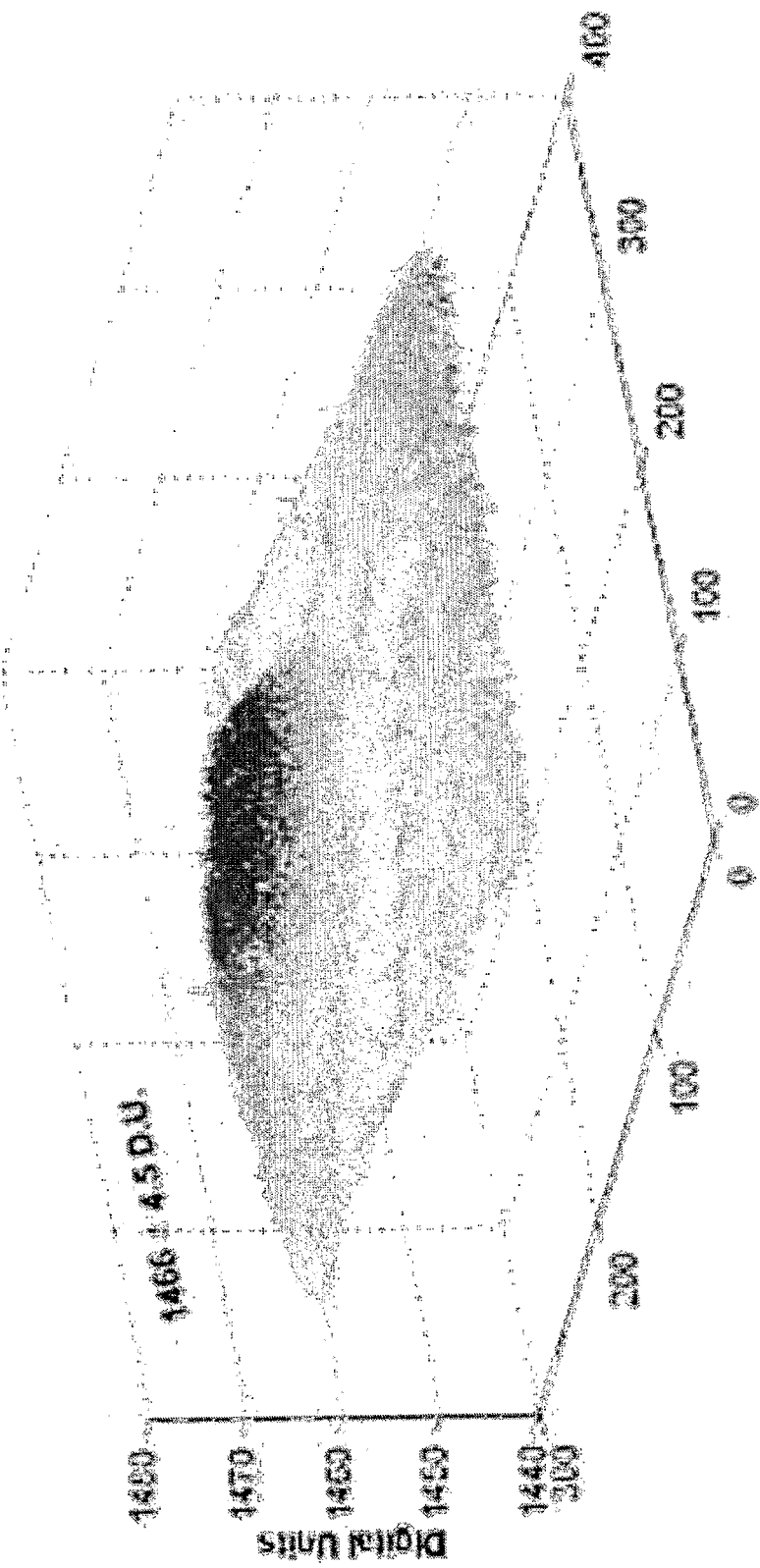
FIG. 4A-4B provides a 3-D representation of the corrected INT1–INT2 image before and after HP filtering.
Figure 4B:
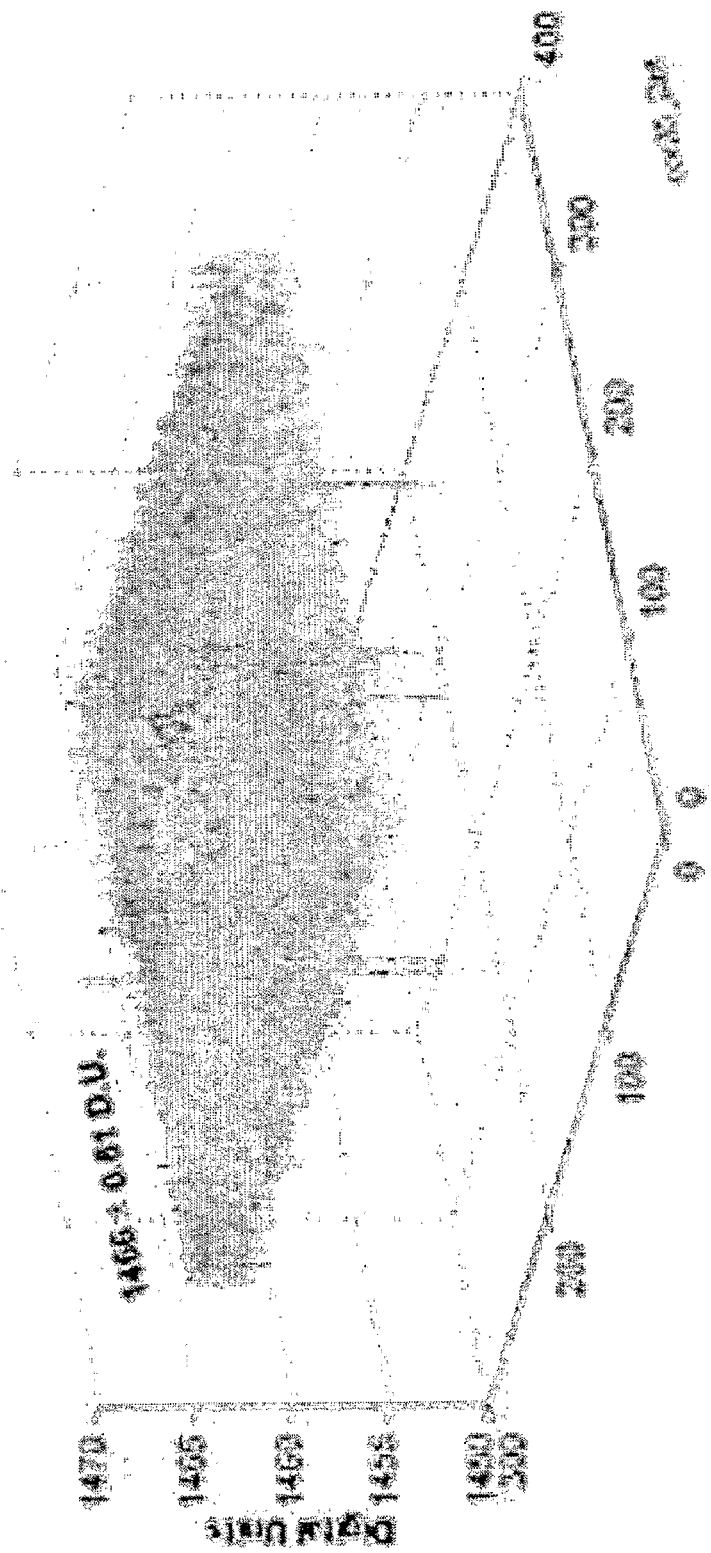

In order to improve these results, the gain correction described in the subsection "Additional Image Correction Technique 2" was applied to the images of FIGS. 3A-3B, where the gain correction coefficients were derived from two integration periods ($t_1$=about 1.5 ms and $t_2$=about 0.5 ms) with a black body temperature of 25° C. FIG. 4A provides an image map in the absence of HP filtering, while FIG. 4B provides an image map after HP filtering.

The gain correction reduces the measured non-uniformity in the absence of HP filtering from 78.7 LSB rms to 4.5 LSB rms. (compare FIGS. 3A and 4A). Furthermore, the gain correction together with HP filtering reduces the residual non-uniformity (RNU) to 0.81 LSB rms (FIG. 4B), below the temporal noise level of 1.5 LSB rms.

It is noted that these gain coefficients can be stored and subsequently used in real time.

Experiments were performed both for the case where detector elements were cooled to 77 K and the case where the detector elements were cooled to 70 K.

Figure 5A:
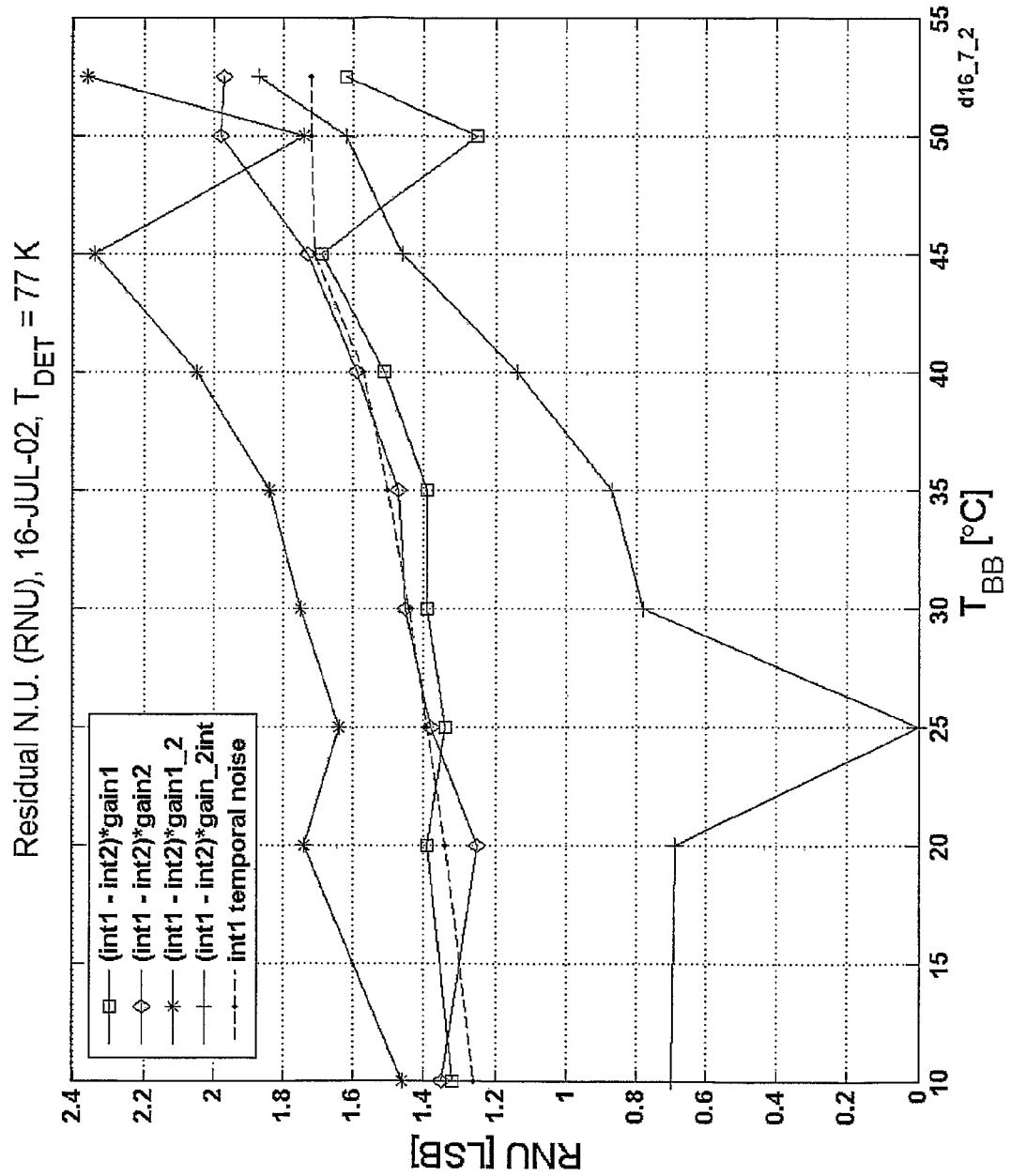
FIG. 5A-5B provides a graph analyzing the effect of blackbody temperature on obtained RNU using a number of exemplary image correction methods of the present invention.
Figure 5B:
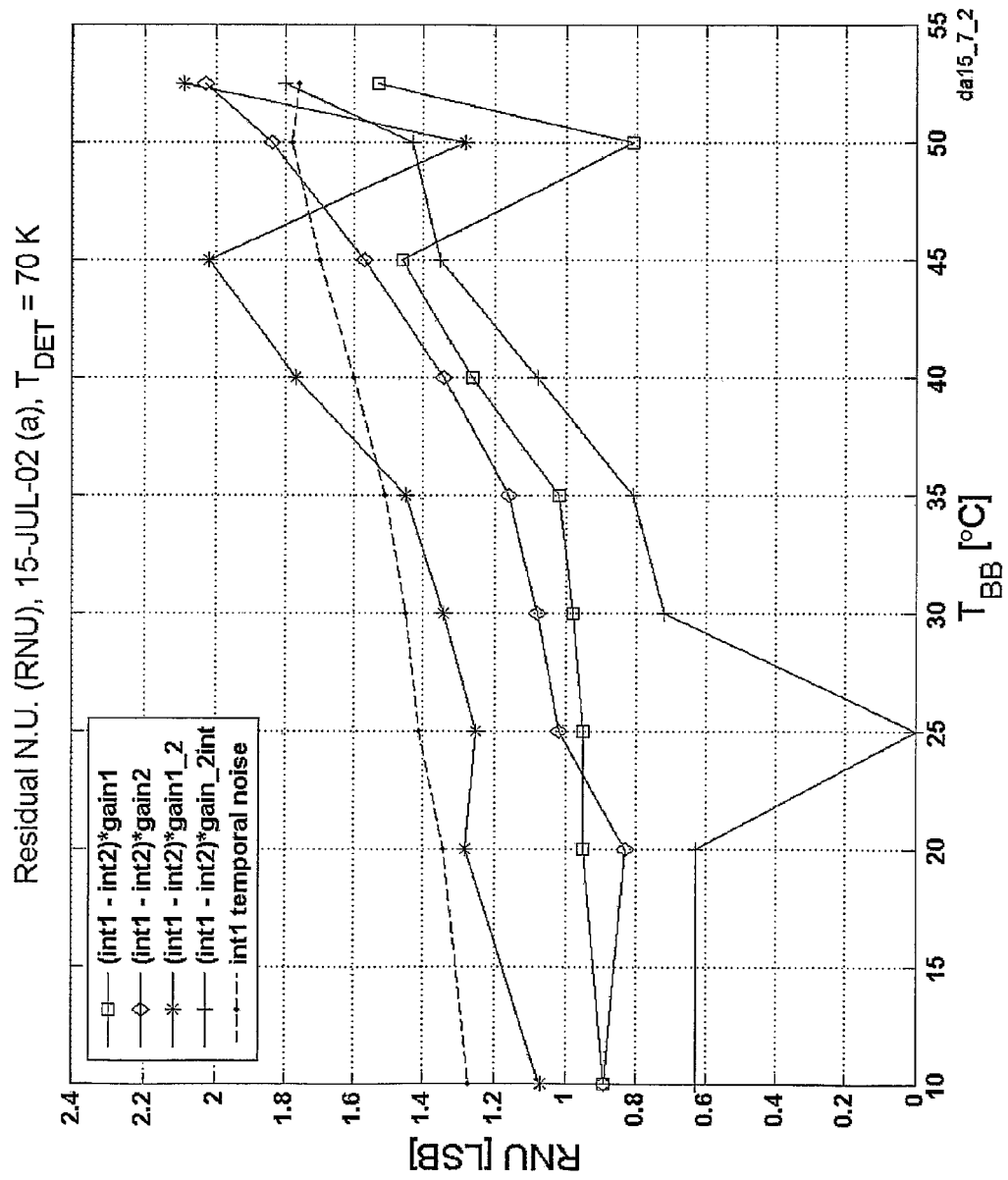

In order to analyze the effect of blackbody temperature on the obtained RNU, a number of experiments were conducted for different blackbody temperatures (FIGS. 5A-5B). The residual non-uniformity after HP filtering was calculated for the following cases:
  A) the image obtained by taking a difference of two images having different integration periods, e.g. INT1−INT2, with no further gain coefficient or offset correction. (the series labeled as "int1−int2");
  B) the image INT1−INT2 corrected by multiplying by pixel-specific gain coefficients derived from two reference images as explained in the subsection "Additional Image Correction Technique 1", VARIATION B where the two reference images have a integration period of $t_1$ (about 1.5 ms) and are derived from black bodies at 20° C. and 50° C. (the series labeled as "(int1−int2)*gain1");
  C) the image INT1−INT2 corrected by multiplying by pixel-specific gain coefficients derived from two reference images as explained in the subsection "Additional Image Correction Technique 1", VARIATION A where the two reference images have a integration period of $t_2$ (about 0.5 ms) and are derived from black bodies at 20° C. and 50° C. (the series labeled as "(int1−int2)*gain2");

D) the image INT1–INT2 corrected by multiplying by pixel-specific gain coefficients derived from two reference images as explained in the subsection "Additional Image Correction Technique 2." VARIATION C, where each reference image is the computed difference between a first image having an integration period $t_1$ (about 1.5 ms) and a second image having an integration period $t_2$ (about 0.5 ms) of black bodies at 20° C. and 50° C. (the series labeled as "(int1–int2)*gain1_2");

E) the image INT1–INT2 corrected by multiplying by pixel-specific gain coefficients derived from two reference images as explained in the subsection "Additional Image Correction Technique 2," where the both reference images are from a black body at 25° C. and the first reference image has a integration period of $t_1$ (about 1.5 ms) and the second image having an integration period $t_2$ (about 0.5 ms) (the series labeled as "(int1–int2)*gain_2int");

On the graph in FIG. 5A, these results are compared with the temporal noise associated with the INT1 images (int1 temporal noise).

These experiments were conducted a first time where the temperature of the detector elements was 77K (FIG. 5A), and a second time where the temperature of the detector elements was 70K (FIG. 5B).

More experiments were conducted, where the gain coefficients table used in the NUC procedure was taken from earlier calibration. The resulting RNU was still below the temporal noise, further supporting the stability of the gain coefficients.

Figure 6A:
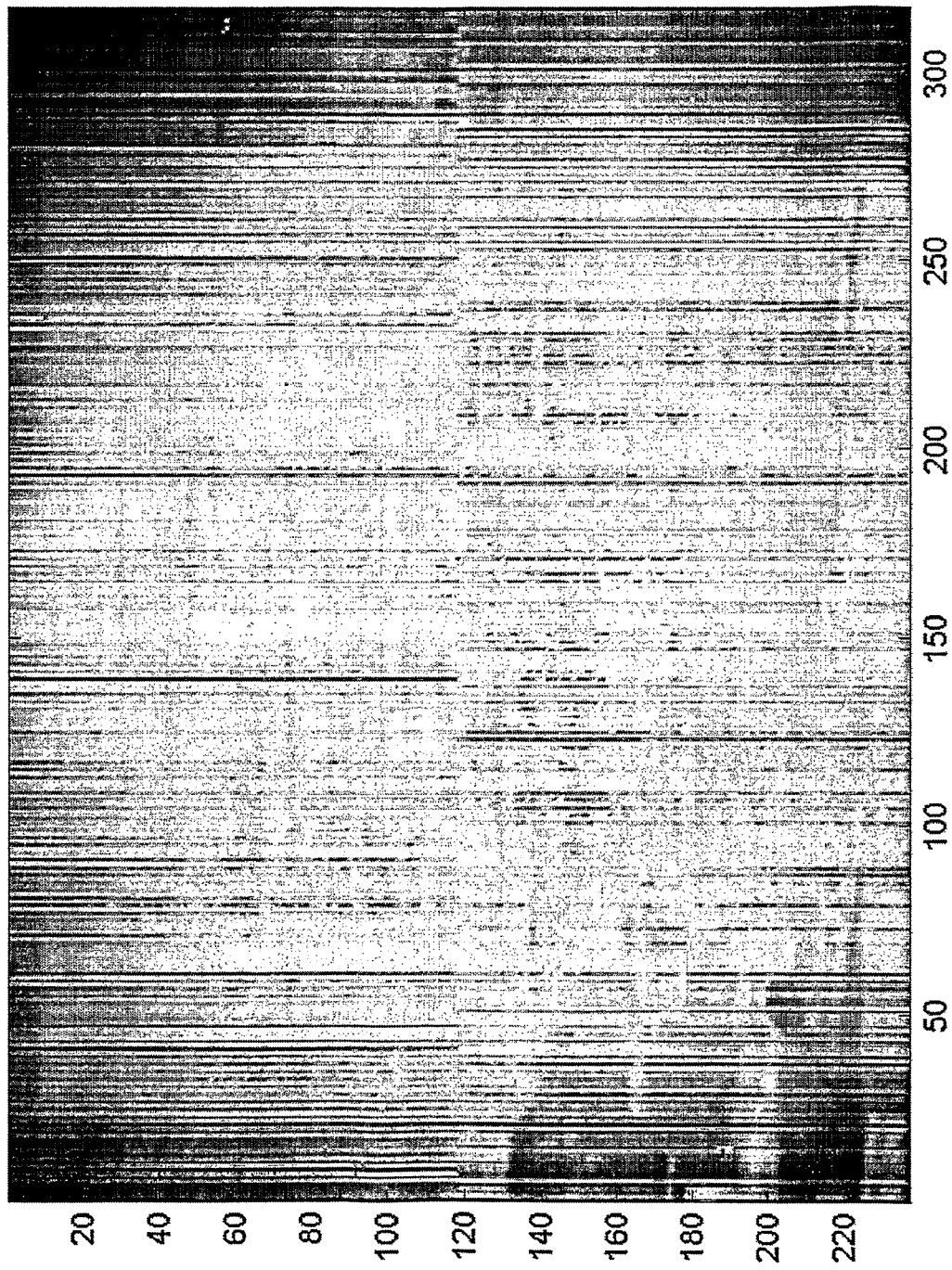
FIG. 6A-6D provide a sequence of images illustrating different stages of processing an image of a scene.
Figure 6B:
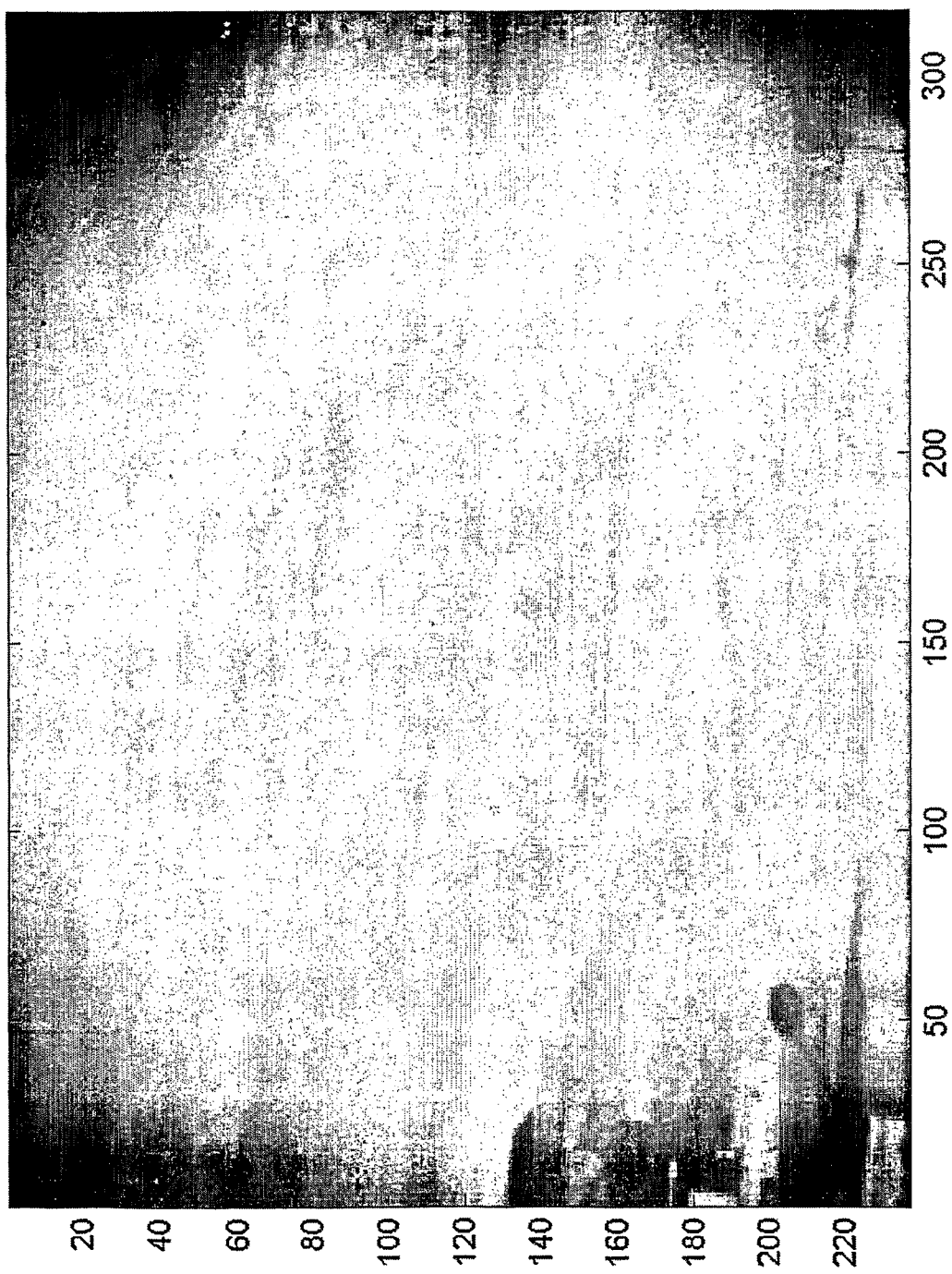

Examples of images of a scene are provided in FIGS. 6A-6B.

FIG. 6A provides an uncorrected single frame image, taken at INT1, after BPR (Bad Pixels Replacement).

FIG. 6B provides the subtracted image INT1–INT2.

Figure 6C:
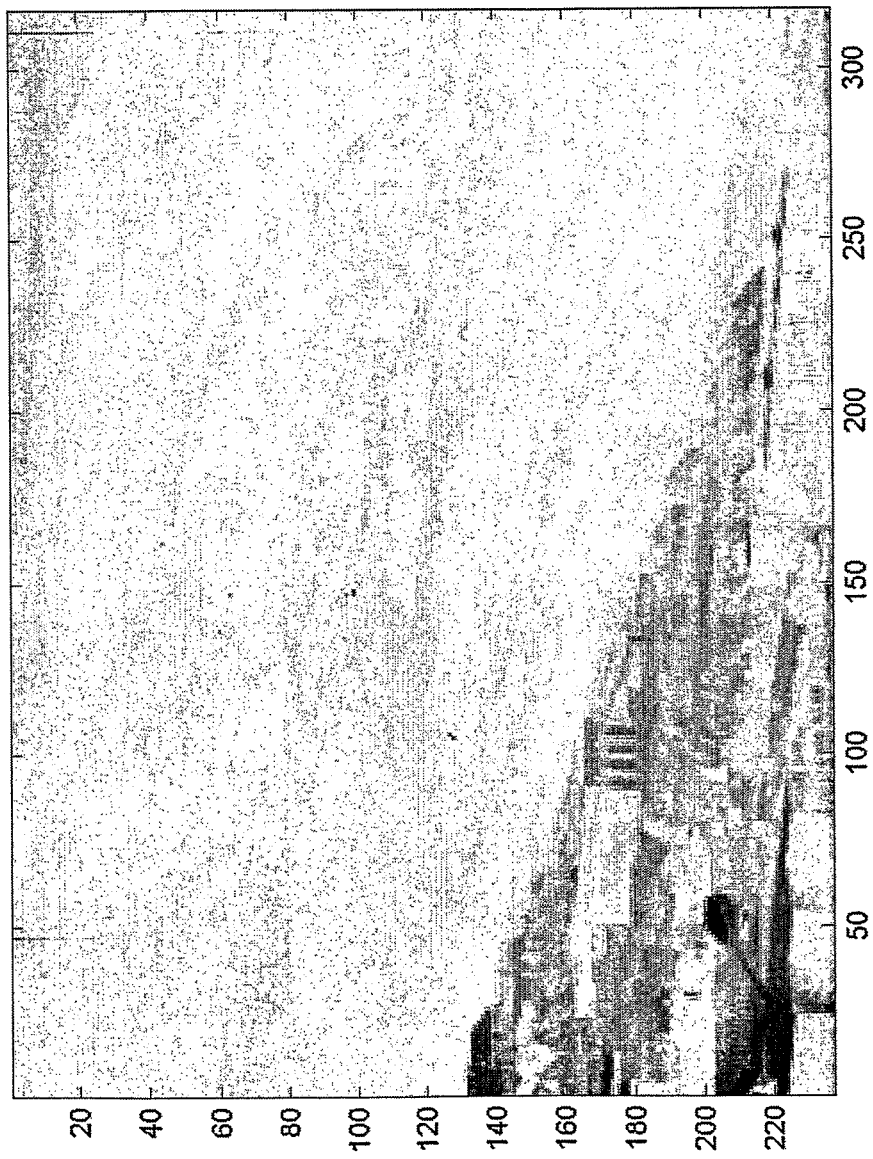

FIG. 6C provides the image of FIG. 6B after gain correction, where the gain coefficients are derived from 2 integration periods of black body reference images at 25 C.

Figure 6D:
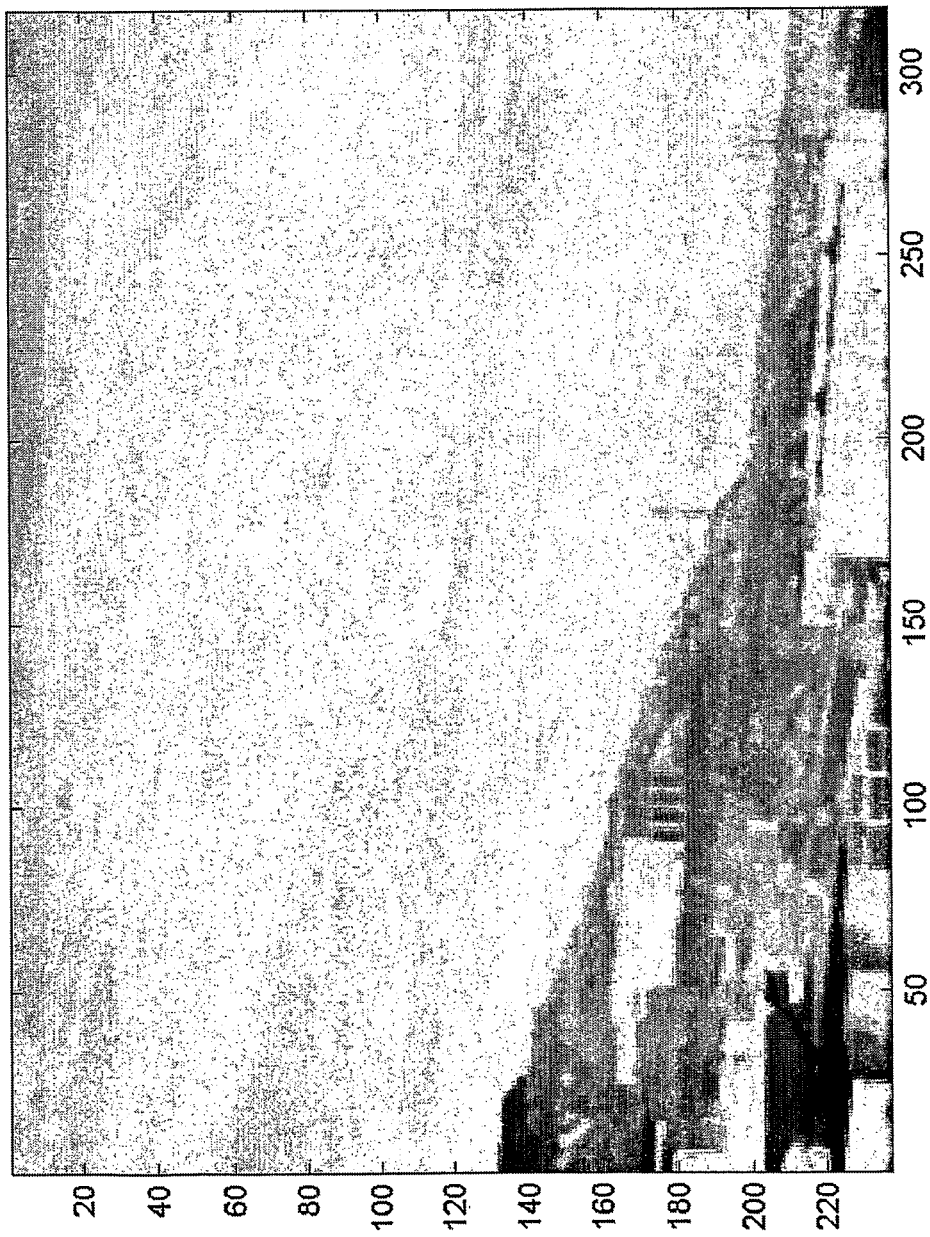

FIG. 6D provides the image corrected by a conventional NUC procedure within the IR camera. The correction procedure is based on a temperature-controlled surface, introduced in front of the detector at startup.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method of imaging a scene with a focal plane array of photodetector elements, the method comprising:
   a) using the photodetector elements to obtain a first image of the scene having a first integration period;
   b) using the photodetector elements to obtain a second image of the scene having a second integration period different from first integration period; and
   c) computing a difference between said first and second images to serve as a preliminary corrected image of the scene; and
   d) evaluating said preliminary corrected image to determine whether said preliminary corrected image requires further correction before being provided as a final corrected image.

2. The method of claim 1 wherein said first and second images are infrared images, and said generating includes generating a preliminary corrected infrared image.

3. The method of claim 1 wherein said first and second images are images of substantially identical scenes.

4. The method of claim 1 wherein said first and second images are substantially in-focus images.

5. The method of claim. 4, further comprising:
   e) if said preliminary corrected image requires said further correction:
      applying said further correction to said preliminary corrected image.

6. The method of claim 5 wherein steps (a)-(e) are repeated for a plurality of frames to form a video of the scene.

7. The method of claim 1, further comprising:
   e) if said preliminary corrected image requires said further correction:
      applying said further correction to said preliminary corrected image.

8. The method of claim 7 wherein said further correction includes: for each image pixel of said corrected image, computing a function of a pixel value of said preliminary corrected image and pixel-specific correction coefficients.

9. The method of claim 8 wherein said pixel-specific correction coefficients are gain correction coefficients, and said function is a multiplication.

10. The method of claim 8 wherein said pixel-specific coefficients are a predetermined pixel-specific coefficients, and said predetermining of said pixel-specific correction coefficient includes the step of obtaining at least one reference image using the photodetector elements.

11. The method of claim 10 wherein said reference image is taken against a substantially uniform background.

12. The method of claim 10 wherein at least a pair of said reference images is obtained, each image of said pair of reference images having a different integration period.

13. The method of claim 7 wherein said further correction includes correcting for image non-uniformity derived from factors dependent on the image integration period.

14. The method of claim 13 wherein said integration period-dependent factor is selected from the group consisting of non-uniform gain and non-uniformities due to optical factors.

15. The method of claim 7 wherein said further correction includes correcting for a gradual non-uniformity having a low spatial frequency.

16. A multi-element staring imaging system comprising:
   a) a focal plane array of photodetector elements for generating images of a scene;
   b) an image integration period regulator for regulating integration periods of said images to capture with said detector elements a first image of the scene having a first integration period and a second image of the scene having a second integration period; and
   c) electronic circuitry for:
      i) computing a difference between said first and second images to serve as a preliminary corrected image of the scene, and ii) evaluating said preliminary corrected image to determine whether said preliminary corrected image requires further correction before being provided as a final corrected image.

17. The system of claim 16 wherein said array of detector elements includes infrared detector elements and said first, second and preliminary corrected images of said scene are infrared images.

18. The system of claim 16 wherein said first and second images are images of substantially identical scenes.

19. The system of claim 16 wherein said first and second images are substantially in-focus images.

20. The system of claim 16 wherein said electronic circuitry is operative to generate a video image from a plurality of said final corrected images of the scene.

21. The system of claim 16 wherein said electronic circuitry is operative to effect said further correction of said preliminary corrected image by computing a function of a pixel value and pixel-specific correction coefficients for each image pixel of said preliminary corrected image.

22. The system of claim 21 wherein said pixel-specific correction coefficients are gain correction coefficients, and said function is a multiplication.

23. The system of claim 22 wherein said electronic circuitry is operative to generate said correction coefficients from at least one previously generated reference image.

24. The system of claim 22 said electronic circuitry is operative to generate said correction coefficients from a plurality of said previously generated reference images having different integration periods.

25. The system of claim 16 wherein at least one said detector element is operative to detected electromagnetic radiation having a wavelength between about 3 microns and about 5 microns.

26. The system of claim 16 wherein at least one said detector element is operative to detected electromagnetic radiation having a wavelength between about 8 microns and about 12 microns.

27. A method of imaging a scene with a focal plane array of photodetector elements, the method comprising:
a) using the photodetector elements to obtain a first image of the scene having a first integration period;
b) using the photodetector elements to obtain a second image of the scene having a second integration period different from first integration period;
c) generating a corrected image of the scene by computing a difference between said first and second images; and
d) for each image pixel of said corrected image, effecting a further correction by computing a function of a pixel value of said corrected image and pixel-specific correction coefficients;
wherein said pixel-specific coefficients are a predetermined pixel-specific coefficients, and said predetermining of said pixel-specific correction coefficient includes the step of obtaining at least one reference image using the photodetector elements;
wherein at least a pair of said reference images is obtained, each image of said pair of reference images having a different integration period; and
wherein each image of said pair of reference images is obtained at against uniform backgrounds of a substantially identical temperature.

28. A method of imaging a scene with a focal plane array of photodetector elements, the method comprising:
a) using the photodetector elements to obtain a first image of the scene having a first integration period;
b) using the photodetector elements to obtain a second image of the scene having a second integration period different from first integration period;
c) generating a corrected image of the scene by computing a difference between said first and second images; and
d) for each image pixel of said corrected image, effecting a further correction by computing a function of a pixel value of said corrected image and pixel-specific correction coefficients;
wherein said pixel-specific coefficients are a predetermined pixel-specific coefficients, and said predetermining of said pixel-specific correction coefficient includes the step of obtaining at least one reference image using the photodetector elements; and
wherein a plurality of said reference images is obtained, including a first said reference image taken against a substantially uniform background of a first temperature, and a second said reference image taken against a substantially uniform background of a second temperature different from said first temperature.

29. A method of imaging a scene with a focal plane array of photodetector elements, the method comprising:
a) using the photodetector elements to obtain a first image of the scene having a first integration period;
b) using the photodetector elements to obtain a second image of the scene having a second integration period different from first integration period; and
c) generating a corrected image of the scene by computing a difference between said first and second images;
wherein the method is implemented using detector elements cooled to a temperature below an atmospheric boiling temperature of liquid nitrogen.

30. A method of imaging a scene with a focal plane array of photodetector elements, the method comprising:
a) using the photodetector elements to obtain a first image of the scene having a first integration period;
b) using the photodetector elements to obtain a second image of the scene having a second integration period different from first integration period; and
c) generating a corrected image of the scene by computing a difference between said first and second images;
wherein the method is implemented using detector elements cooled to a temperature that is substantially an atmospheric boiling point of liquid nitrogen.

31. A multi-element staring imaging system comprising:
a) a focal plane array of photodetector elements for generating images of a scene;
b) an image integration period regulator for regulating integration periods of said images to capture with said detector elements a first image of the scene having a first integration period and a second image of the scene having a second integration period;
c) electronic circuitry for generating a corrected image of the scene by computing a difference between said first and second images; and
d) a cooling unit for cooling said detector elements to a temperature that is substantially equal to an atmospheric boiling point of liquid nitrogen.

* * * * *